US007039384B2

(12) United States Patent
Pan

(10) Patent No.: US 7,039,384 B2

(45) Date of Patent: May 2, 2006

(54) LOW POWER BAND-GAP CURRENT REFERENCE

(75) Inventor: Meng-An (Michael) Pan, Cerritos, CA (US)

(73) Assignee: Broadcom Corporation, Irvine, CA (US)

( * ) Notice: Subject to any disclaimer, the term of this patent is extended or adjusted under 35 U.S.C. 154(b) by 529 days.

(21) Appl. No.: 10/459,856

(22) Filed: Jun. 12, 2003

(65) Prior Publication Data

US 2004/0253937 A1 Dec. 16, 2004

(51) Int. Cl.
*H04B 1/28* (2006.01)

(52) U.S. Cl. .................. 455/333; 455/127.1; 455/318; 455/334; 323/313; 323/314; 327/539; 327/542; 327/543

(58) Field of Classification Search ............ 455/127.1, 455/343.1, 118, 313, 314, 334; 323/313, 323/314; 327/539, 542, 543
See application file for complete search history.

(56) References Cited

U.S. PATENT DOCUMENTS

2002/0070793 A1 * 6/2002 Ochi .......................... 327/539
2003/0006831 A1 * 1/2003 Coady ........................ 327/539
2003/0087617 A1 * 5/2003 Shohara .................. 455/192.2

* cited by examiner

*Primary Examiner*—Curtis Kuntz
*Assistant Examiner*—Tuan H. Nguyen
(74) *Attorney, Agent, or Firm*—Garlick Harrison & Markison LLP; Timothy W. Markison

(57) ABSTRACT

A low power supply band-gap current reference includes a $1^{st}$ P-N junction device, a $2^{nd}$ and P-N junction device, a $1^{st}$ current source, a $2^{nd}$ current source, a $1^{st}$ resistor, a $2^{nd}$ resistor, a $3^{rd}$ resistor, an operational amplifier, and a current mirror. The $1^{st}$ and $2^{nd}$ P-N junction devices are operably coupled to the $1^{st}$ and $2^{nd}$ current sources, respectively. The $2^{nd}$ P-N junction device is a larger device than the $1^{st}$ P-N junction device. The $2^{nd}$ resistor is operably coupled in parallel with the $1^{st}$ P-N junction device and the $2^{nd}$ resistor is coupled in series with the $2^{nd}$ P-N junction device. The $3^{rd}$ resistor is coupled in parallel with the series combination of the $2^{nd}$ resistor and $2^{nd}$ P-N junction device. The operational amplifier is coupled to control the $1^{st}$ and $2^{nd}$ current sources based on the voltage imposed across the $1^{st}$ and $2^{nd}$ resistors. The current mirror is operably coupled to mirror the current of the $1^{st}$ and/or $2^{nd}$ current source to provide a band-gap reference current.

18 Claims, 6 Drawing Sheets bandgap current reference 77 bandgap current reference 77 bandgap current reference 77

LOW POWER BAND-GAP CURRENT REFERENCE

BACKGROUND OF THE INVENTION

Technical Field of the Invention

This invention relates generally to integrated circuits and more particularly to band-gap references used in such integrated circuits.

DESCRIPTION OF RELATED ART

Integrated circuits are used in an abundance of electronic devices ranging, for example, from handheld games to computers to communication systems to home appliances and beyond. Integrated circuits can be manufactured using a variety of processes including bipolar, CMOS, gallium arsenide, and silicon germanium. Of these processes, CMOS is the most popular due to its flexibility to support various circuit topologies, its circuit density (i.e. amount of transistors per die area), and its cost. CMOS integrated circuits, however, are not perfect. For instance, the performance of the components fabricated utilizing a CMOS process varies over temperature and also varies from integrated circuit to, integrated circuit. Multiple techniques have been developed to compensate for these variations including match component designs, band-gap references, calibration circuits, et cetera.

Band-gap voltage references are used on almost every integrated circuit to provide a fixed reference voltage that does not drift over temperature and may be designed to be process variant independent or process variant dependent. Typically, a band-gap circuit is designed to provide a 1.2 volt reference that does not vary over temperature. This is typically done by taking advantage of the known temperature related properties of CMOS transistors. As is known, a base emitter voltage (VBE) of a CMOS transistor that is emulating a bipolar transistor decreases over temperature. As is further known, the slope of the $V_{BE}$ versus temperature curve varies based on the size of the transistor, where a smaller transistor has a greater slope than a larger transistor. Based on this property, a positive slope difference ratio may be produced over temperature between the two transistors of different sizes. This difference ratio may be scaled to have an equal but opposite slope of the $V_{BE}$ versus temperature curve for the smaller transistor. Utilizing these inversely proportional curves, a temperature independent band-gap voltage reference is achieved.

The band-gap voltage reference can be resistor-independent or resistor-dependent. The resistor-dependent band-gap voltage reference is one that produces a voltage that, from integrated circuit to integrated circuit varies due to process variations inherent in the CMOS integrated circuit fabrication process of producing resistors. Circuits whose operations are resistor-dependent use resistor-dependent band-gap voltage references. For example, an amplifier with resistive loads is a circuit whose operation is resistor-dependent. In particular, the process variations of the resistive load (i.e., the resistor value, for integrated circuit to integrated circuit varies) affect the gain of the amplifier. By utilizing a resistor-dependent band-gap voltage reference for such circuits, the process variations that affect the circuit also affect the band-gap voltage reference in a similar manner such that, from integrated circuit to integrated circuit, the circuit performs in a substantially similar manner.

A resistor-independent band-gap voltage reference is one that, from integrated circuit to integrated circuit, produces a substantially similar voltage reference. Circuits whose performance are not affected by process variations in fabricating resistors, but are dependent on an accurate voltage reference use resistor-independent band-gap voltage references. For example, analog-to-digital converters, digital-to-analog converters and other digital circuits are circuits that use a resistor independent bandgap voltage reference.

Many integrated circuits include circuits whose performance is resistor-dependent and circuits whose performance is resistor-independent. To accommodate both types of circuits, the integrated circuit includes, two band-gap references: one that is resistor-dependent and one that is resistor-independent.

A band-gap voltage reference, whether resistor-independent or resistor-dependent, includes at least three stacked transistors per leg, which requires a supply voltage of at least 2.1 volts. Such a restriction presents a significant problem as the CMOS process evolves to allow integrated circuits to be powered from voltage sources of 1.8 volts and below. For these low supply voltage CMOS integrated circuits, the band-gap reference will not operate properly thus will not provide a reliable band-gap voltage reference.

Therefore, a need exists for a low supply voltage band-gap reference that can be extended to supply both a resistor-dependent band-gap reference and a resistor-independent band-gap reference.

BRIEF SUMMARY OF THE INVENTION

A low power supply ha nd-gap current reference of the present invention substantially meets these needs and others. In one embodiment, a low power supply band-gap current reference includes a $1^{st}$ P-N Junction device, a $2^{nd}$ P-N junction device, a $1^{st}$ current source, a $2^{nd}$ current source, a $1^{st}$ resistor, a $2^{nd}$ resistor, a $3^{rd}$ resistor, an operational amplifier, and a current mirror. The $1^{st}$ and $2^{nd}$ P-N junction devices may be diodes, bipolar transistors, and/or field effect transistors operable to emulate bipolar transistors, are operably coupled to the $1^{st}$ and $2^{nd}$ current sources, respectively. The $2^{nd}$ P-N junction device is a larger device than the $1^{st}$ P-N junction device. The $1^{st}$ resistor is operably coupled in parallel with the $1^{st}$ P-N junction device and the $2^{nd}$ resistor is coupled in series with the $2^{nd}$ P-N junction device. The $3^{rd}$ resistor is coupled in parallel with the series combination of the $2^{nd}$ resistor and $2^{nd}$ P-N junction device. As configured, the voltage across the 1$^{st}$ resistor emulates the base emitter voltage of the $1^{st}$ P-N junction device and the voltage across the $2^{nd}$ resistor emulates the difference between the base emitter voltage of the $1^{st}$ P-N junction device less the base emitter voltage of the $2^{nd}$ P-N junction device. The operational amplifier is coupled to control the $1^{st}$ and $2^{nd}$ current sources based on the voltage imposed across the $1^{st}$ and $2^{nd}$ resistors. The current mirror is operably coupled to mirror the current of the $1^{st}$ and/or $2^{nd}$ current source to provide a band-gap reference current.

In another embodiment, a low power supply band-gap current reference includes a $1^{st}$ P-N junction device, a $2^{nd}$ P-N junction device, a $1^{st}$ current source, a $2^{nd}$ current source, a temperature compensation circuit, and a current mirror. The $1^{st}$ and $2^{nd}$ P-N junction devices, where the $2^{nd}$ P-N junction device is larger than the $1^{st}$ P-N junction device, are coupled to the $1^{st}$ and $2^{nd}$ current sources, respectively. The temperature compensation circuit is operably coupled to convert the $1^{st}$ temperature variant active voltage into a $1^{st}$ active current, where the $1^{st}$ temperature variant active voltage corresponds to the base emitter voltage of the $1^{st}$ P-N junction device. The temperature compensation circuit then converts a difference between the $1^{st}$ temperature variant active voltage and the $2^{nd}$ temperature variant active, voltage into a $2^{nd}$ active current. The $2^{nd}$ temperature variant active voltage corresponds to the base emitter voltage of the $2^{nd}$ P-N junction device. The temperature compensation circuit then sums the $1^{st}$ and $2^{nd}$ active currents to produce a temperature invariant current. The temperature compensation circuit then controls the currents produced by the $1^{st}$ and $2^{nd}$ current sources based on the temperature invariant current. The current mirror is operably coupled to mirror the current in the $1^{st}$ and/or $2^{nd}$ current source to provide the band-gap reference current. Such an embodiment provides an accurate band-gap reference, in a current mode, from supply voltages under 2 volts.

DETAILED DESCRIPTION OF THE INVENTION

Figure 1:
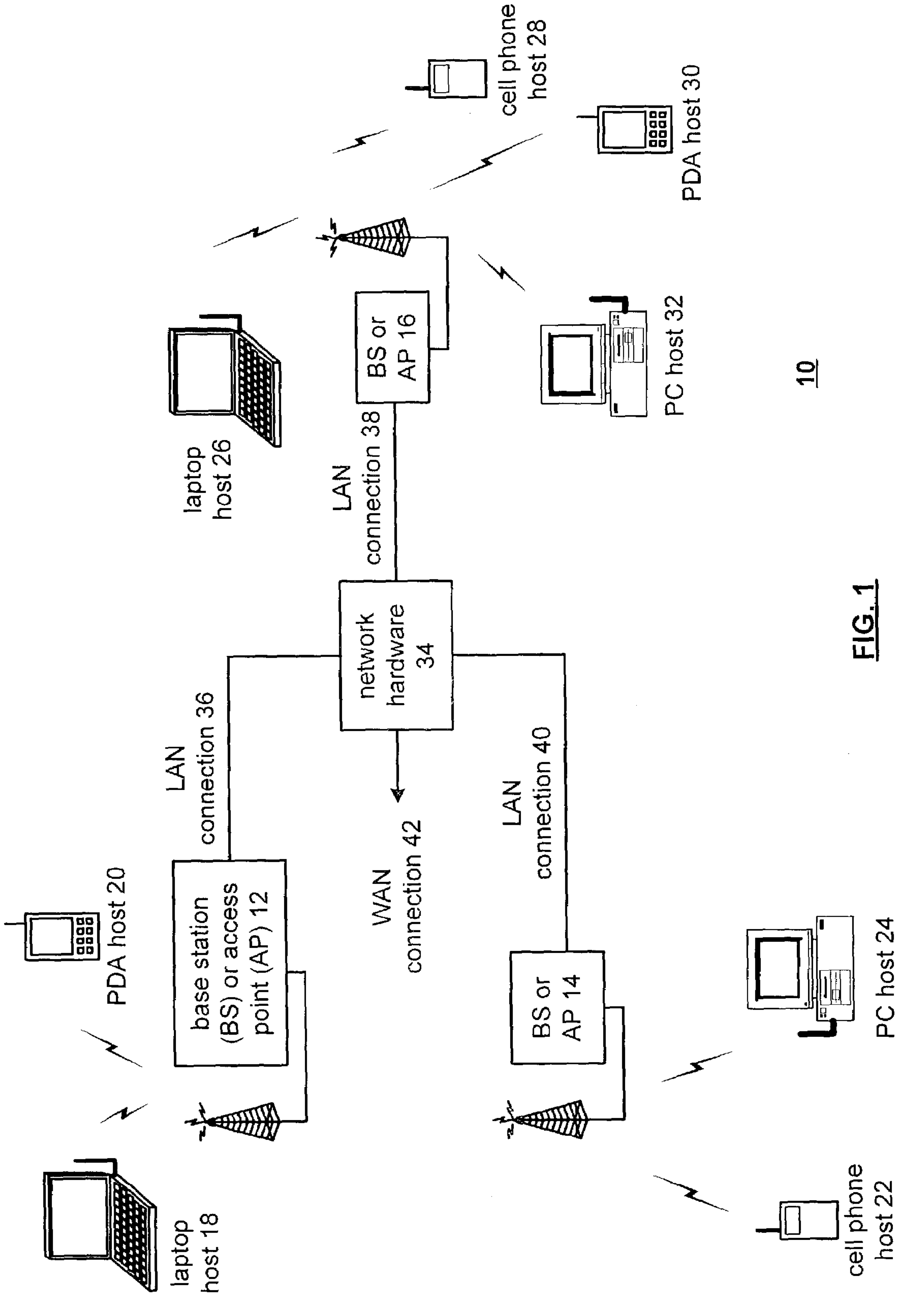
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
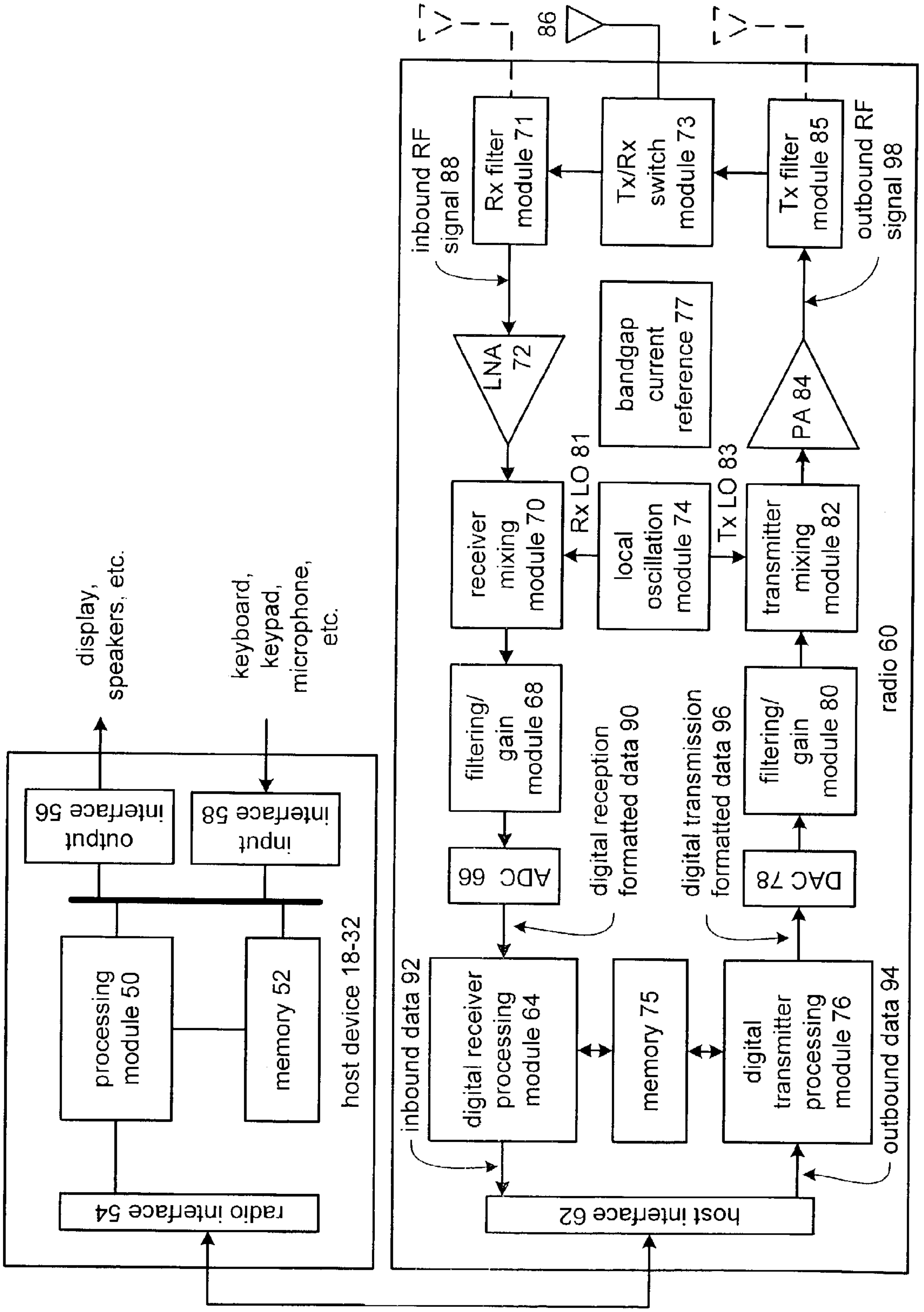
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a bandgap current reference 77, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter, functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

The bandgap current reference, 77, which may be implemented in accordance with the teachings of the present invention, provide a bandgap current reference to one or more of the LNA 72, the receiver mixing module 70, the filter/gain module 68, the ADC 66, the local oscillation module 74, the DAC 78, the filter/gain module 80, the transmitter mixing module 82, and the power amplifier 84.

As one of average skill in the art, will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figures 3, 3A, 3B:
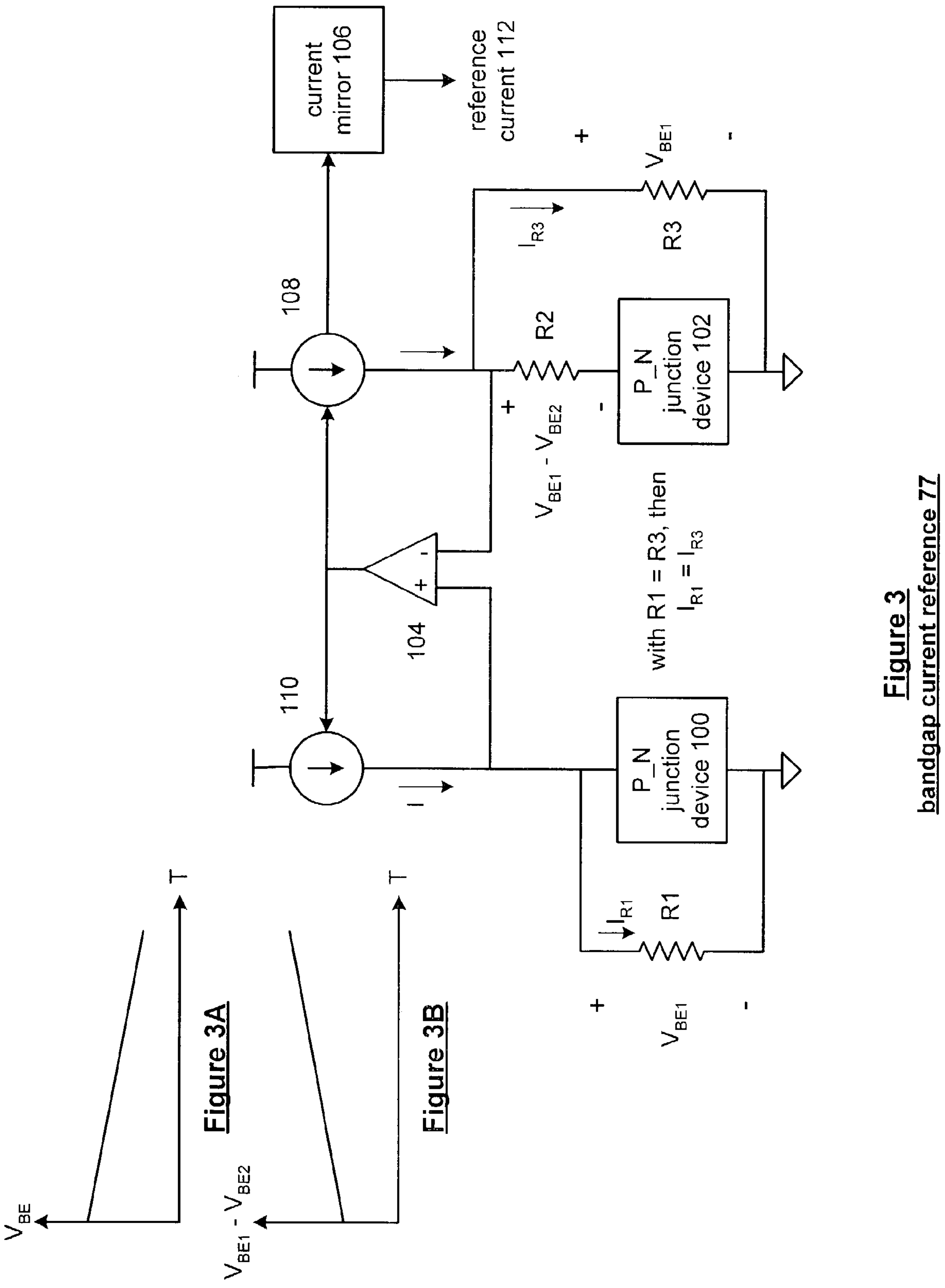
FIG. 3 is a schematic block diagram of a band-gap current reference in accordance with the present invention.
FIGS. 3A and 3B are graphs of voltages of the band-gap current reference of FIG. 3.

FIG. 3 is a schematic block diagram of a band-gap current reference 77 that includes two P-N junction devices 100 and 102, two current sources 108 and 110, an operational amplifier 104, a current mirror 106 and resistors R1–R3. The P-N junction devices may be diodes, bipolar transistors, and/or field effect transistors operably coupled to emulate bipolar transistors. In this illustration, the $2^{nd}$ P-N junction device 102 is larger than the $1^{st}$ P-N junction device 100. For example, the $2^{nd}$ P-N junction device 102 may be four times the size (i.e., consume four times the die area in width times length of the transistor) than the 1$^{st}$ P-N junction device 100. Accordingly, with reference to FIG. 3A, the slope of the $V_{BE}$ versus temperature curve for the $1^{st}$ P-N junction device 100 will have a larger slope than the corresponding curve for the $2^{nd}$ P-N junction device 102.

The $1^{st}$ and $2^{nd}$ current sources 110 and 108 produce substantially equal currents (I) that are provided to the corresponding P-N junction devices 100 and 102. As shown, P-N junction device 102 is coupled in series with resistor R2. Resistor R1 is coupled in parallel with the P-N junction device 100 while resistor R3 is coupled in parallel with the series combination of R2 and the $2^{nd}$ P-N junction device 102. The resistive values of R1 and R3 are substantially similar and may be in the range of 1 kilo-Ohms to 1000 kilo-Ohms. The resistive value of the $2^{nd}$ resistor R2 is scaled with respect to the resistive value of the 1$^{st}$ and $3^{rd}$ resistors to adjust the slope of the $V_{BE1}$–$V_{BE2}$ curve to be substantially inversely proportional with the $V_{BE1}$ versus temperature curve for the $1^{st}$ P-N junction device 100. With respect to FIG. 3B, the $V_{BE1}$–$V_{BE2}$ versus temperature curve is illustrated to have a positive slope. As indicated, by scaling resistor R2 the slope of $V_{BE1}$–$V_{BE2}$ may be inversely proportional to the slope of $V_{BE1}$ versus temperature as shown in FIG. 3A.

As further illustrated, the voltage imposed across R1 and the voltage imposed across R3 correspond to the base emitter voltage of the $1^{st}$ P-N junction device 100 ($V_{BE1}$). The voltage imposed across resistor R2 corresponds to the difference between $V_{BE1}$ and $V_{BE2}$. The operational amplifier 104 regulates the currents produced by the current sources 110 and 108 to remain constant over temperature based on the inversely proportional slopes of $V_{BE1}$ and $V_{BE1}-V_{BE2}$. As such, the current sources produce a current that is proportional to the voltage across resistors R1 and R2. In particular, $$I_{P\text{-}N\_100}=I_{CS\_110}*\exp(V_{BE1}/V_t)$$

$$I_{P\text{-}N\_102}=I_{CS\_108}*\exp(V_{BE2}/V_t)$$

$$V_{BE1}=V_t*\ln(I_{P\text{-}N\_100}/I_{CS\_110})$$

$$V_{BE2}=V_t*\ln(I_{P\text{-}N\_102}/I_{CS\_108})$$

let $I_{P\text{-}N\_100}=I_{P\text{-}N\_102}$, then $$VBE1-VBE2=Vt*\ln(I_{CS\_108})/I_{CS\_110})=Vt*\ln(N),$$

where N is the size difference between the P-N devices, $I_{P\text{-}N\_100}$ is the current through P-N device 100, $I_{CS\_100}$ is the current provided by current source 110, $V_{BE1}$ is the voltage across P-N device 100, and $V_1$ is the threshold voltage of P-N device 100, $I_{P\text{-}N\_102}$ is the current through P-N device 102, $I_{CS\_108}$ is the current provided by current source 108, $V_{BE2}$ is the voltage across P-N device 102, and $V_t$ is the threshold voltage of P-N device 102.

The current mirror 106 is operably coupled to mirror the current produced by current source 108 to produce the reference current 112. The current mirror 106 may alternatively be coupled to mirror the current produced by current source 110. Further, the current mirror 106 may be scaled with respect to current sources 108 and/or 110 to produce a reference current 112 that is equal to the current produced by current sources 108 and/or 112, greater than the current produced by current sources 108 and/or 110, or less than the current produced by 108 and/or 110.

Figure 4:
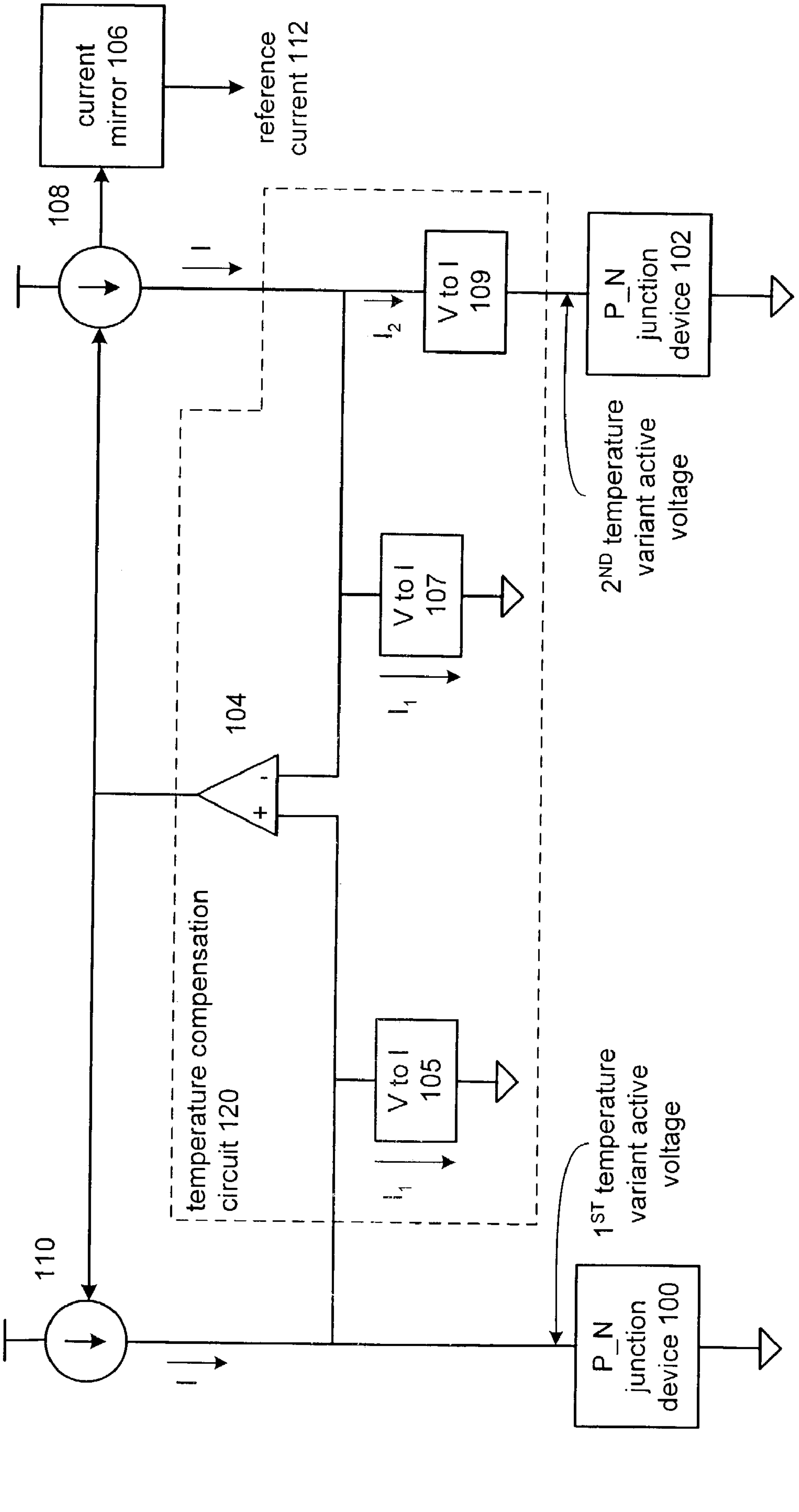
FIG. 4 is a schematic block diagram of another embodiment of a band-gap current reference in accordance with the present invention.

FIG. 4 is a schematic block diagram of an alternate embodiment of a band-gap current reference 77. In this embodiment, the band-gap current reference 77 includes the P-N junction devices 100 and 102, the current sources 108 and 110, the current mirror 106 and further includes a temperature compensation circuit 120. The $1^{st}$ and $2^{nd}$ current sources 108 and 110 may be implemented utilizing P-channel field effect transistors where the gate voltage is regulated by the temperature compensation circuit 120 to produce the desired currents (I). The temperature compensation circuit 120 includes voltage to current devices 105, 107, and 109, which may be resistors, transistors, etc., to convert voltages to currents. For instance, voltage to current device 105 converts the first temperature variant active voltage into a first current $I_t$; voltage to current device 109 converts a difference between the $1^{st}$ and $2^{nd}$ temperature variant active voltages, which corresponds to the base emitter voltage of devices 100 and 102, into a second current 12; and voltage to current device 107 converts the $2^{nd}$ temperature variant active voltage and the voltage drop across the second voltage current device 109 into a third current that equals the first current. Based on these currents, the temperature compensation circuit 120 determines the regulation for current sources 108 and 110, which provides the regulation for current mirror 106 to control the reference current 112. Such a process will be described in greater detail with reference to FIG. 5.

Figure 5:
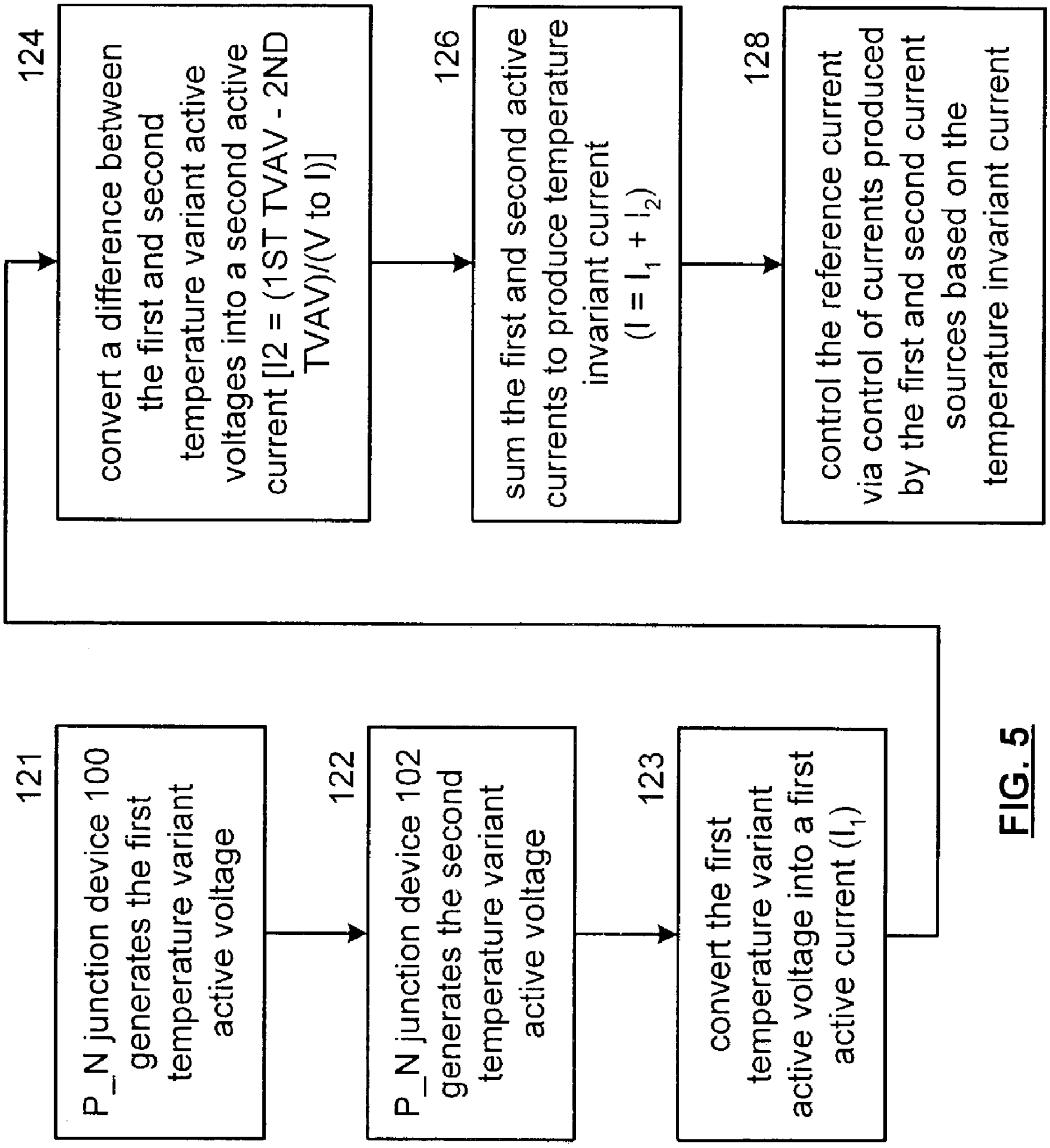
FIG. 5 is a logic diagram of a method performed by the temperature compensation circuit of FIG. 4.

FIG. 5 illustrates a logic diagram that is performed by the temperature compensation circuit 120 to regulate the currents produced by the $1^{st}$ and $2^{nd}$ current sources. The process begins at Steps. 121 and 122 where the P_N junction devices 100 and 102 generate the first and second temperature variant active voltages, respectively. The process then proceeds to Step 123 where the temperature compensation circuit 120 converts the $1^{st}$ temperature variant active voltage into a $1^{st}$ active current $I_1$. The $1^{st}$ active current may represent a slope of the current flowing through the $1^{st}$ P-N junction device with respect to temperature. The process then proceeds to Step 124 where the temperature compensation circuit 120 converts a difference between the $1^{st}$ and $2^{nd}$ temperature variant active voltages into a $2^{nd}$ active current $I_2$. The $2^{nd}$ active current represents a slope of the differences in current through the $1^{st}$ P-N junction device and current through the $2^{nd}$ P-N junction device over temperature where the slope of this curve is inversely proportional to the slope of the current through the $1^{st}$ P-N junction device.

The process then proceeds to Step 126 where the temperature compensation circuit 120 sums the $1^{st}$ and $2^{nd}$ active currents to produce a temperature invariant current. The process then proceeds to Step 128 where the temperature compensation circuit 120 controls the current produced by the $1^{st}$ and $2^{nd}$ current sources based on the temperature invariant current to regulate the reference current. The controlling of the $1^{st}$ and $2^{nd}$ current sources may be done by generating a gate voltage for the P-channel field effect transistor implementation of the $1^{st}$ and $2^{nd}$ current sources.

Figure 6:
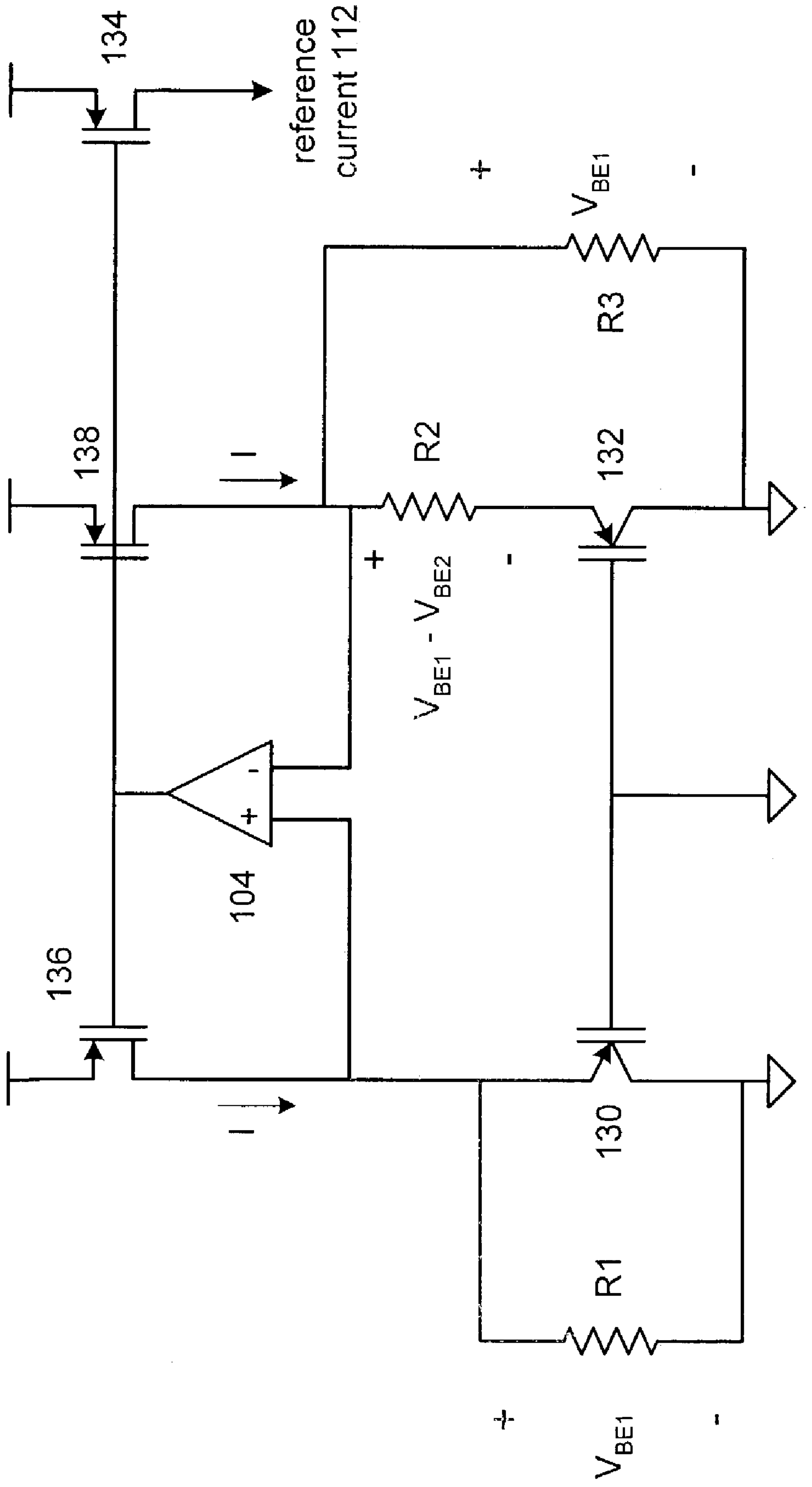
FIG. 6 is a schematic block diagram of yet another embodiment of a band-gap current reference in accordance with the present invention.

FIG. 6 is a schematic block diagram of an alternate embodiment of the band-gap current reference 77. In this illustration, the band-gap current reference 77 includes 3 P-channel transistors 134–136, an operational amplifier 104, 3 resistors R1–R3 and 2 bipolar transistors 130 and 132. The bipolar transistors 130 and 132 may be field effect transistors designed to emulate a bipolar transistor such that a base emitter voltage is established across the corresponding device. In this illustration the $2^{nd}$ bipolar transistor 132 is larger than the $1^{st}$ bipolar transistor 130. The current produced by P-channel transistors 136 and 138 flow through the corresponding bipolar transistors 130 and 132 and produce a corresponding $V_{BE1}$ voltage, which corresponds to the voltage produced by the $1^{st}$ bipolar transistor 130. As is further shown, the $2^{nd}$ bipolar transistor 132 is coupled in series with a resistor R2. The voltage imposed across resistor R2 represents the difference between the base emitter voltage of the $1^{st}$ bipolar transistor 130 less the base emitter voltage of the $2^{nd}$ bipolar transistor 132. The P-channel transistor 134 mirrors the current produced by transistors 136 or 138 to produce the reference current 112.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, (circuit, or module where, for indirect coupling, the intervening component, element, circuit, or module does not modify the information of a signal but may adjust its current level voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments for a low power supply band-gap current reference. By utilizing such an implementation, a reliable and accurate band-gap reference may be produced from low power supplies (e.g., 2 volts and below). As one of average skill in the art will appreciate, other embodiments may be derived from the teachings of the present invention without deviating from the scope of the claims.

What is claimed is:

1. A low power supply bandgap current reference comprises:

first P-N junction device;

second P-N junction device, wherein the second P-N junction device is a larger device than the first P-N junction device;

first resistor coupled in parallel with the first P-N junction device;

second resistor coupled in series with the second P-N junction device, third resistor coupled in parallel with a series combination of the second resistor and the second P-N junction device;

first current source coupled to the first P-N junction device;

second current source coupled to the series combination of the second resistor and the second P-N junction device, wherein the first and second current sources provide substantially similar currents;

operational amplifier operably coupled to control the first and second current sources based on voltages across the first and third resistors; and current mirror operably coupled to the first or second current source to provide a reference current.

2. The low power supply bandgap current-reference of claim 1, wherein resistance value of the second resistor is scaled with respect to resistance of the third resistor to adjust a slope of current through the second P-N junction device over temperature to be inversely proportional to a slope of current through the first P-N junction device over temperature.

3. The low power supply bandgap current reference of claim 1, wherein the first and third resistors have substantially similar resistances.

4. The low power supply bandgap current reference of claim 1, wherein the first and second P-N junction devices each comprise at least one of: a diode, a bipolar transistor, and a field effect transistor operable to emulate the bipolar transistor.

5. A low power supply bandgap current reference comprises:

first P-N junction device having a first temperature variant active voltage;

second P-N junction device having a second temperature variant active voltage, wherein the second P-N junction device is a larger device than the first P-N junction device;

first current source coupled to the first P-N junction device;

second current source coupled to provide a current to the second P-N junction device, wherein the first and second current sources provide substantially similar currents;

temperature compensation circuit operably coupled to:

convert the first temperature variant active voltage into a first active current;

convert a difference between the first temperature variant active voltage and the second temperature variant active voltage into a second active current;

sum the first and second active currents to produce temperature invariant current; and control the currents produced by the first and second current sources based on the temperature invariant current; and current mirror operably coupled to the first or second current source to provide a reference current.

6. The low power supply bandgap current reference of claim 5, wherein the first and second P-N junction devices each comprise at least one of: a diode, a bipolar transistor, and a field effect transistor operable to emulate the bipolar transistor.

7. The low power supply bandgap current reference of claim 5, wherein the first and second current sources each further comprises:

a P-channel field effect transistor.

8. The low power supply bandgap current reference of claim 7, wherein the temperature compensation circuit further functions to control the currents produced by the first and second current sources further comprises:

generating a gate voltage for the P-channel field effect transistor of the first and second current sources based on the temperature invariant current.

9. The low power supply bandgap current reference of claim 5, wherein the temperature compensation circuit further functions to convert the first temperature variant active voltage into a first active current to represent a slope of current through the first P-N junction device over temperature;

convert a difference between the first temperature variant active voltage and the second temperature variant active voltage into a second active current to represent a slope of current through the second P-N junction device over temperature, wherein the slope of the current through the first P-N junction device over temperature is inversely proportional to the slope of the current through the second P-N junction device.

10. A wireless communication device comprises:

a receiver section that includes:

a low noise amplifier operably coupled to amplify an inbound radio frequency (RF) signal to produce an amplified RF signal;

receiver mixing module operably coupled to mix the amplified RF signal with a receiver local oscillation to produce an inbound low intermediate frequency (IF) signal;

receiver filter module operably coupled to filter the inbound low IF signal to produce a filtered inbound low IF signal; and an analog to digital converter operably coupled to convert the filtered inbound low IF signal to produce a digital inbound low IF signal;

a transmitter section that includes:

a digital to analog converter operably coupled to convert an outbound digital low IF signal into an outbound analog low 1F signal;

transmitter mixing module operably coupled to mix the outbound analog low IF signal with a transmitter local oscillation to produce an up-converted signal;

transmitter filter module operably coupled to filter the up-converted signal to produce a filtered up-converted signal; and a power amplifier operably coupled to amplify the filtered up-converted signal to produce a outbound RF signal, wherein at least one of the low noise amplifier, the receiver mixer module, the receiver filter, the analog to digital converter, the digital to analog converter, the transmitter mixing module, the transmitter filter module, and the power amplifier includes a bandgap reference current source that includes:

first P-N junction device;

second P-N junction device, wherein the second P-N junction device is a larger device than the first P-N j unction device;

first current source coupled to the first P-N junction device;

second current source coupled to the second P-N junction device, wherein the first and second current sources provide substantially similar currents;

first resistor coupled in parallel with the first P-N junction device;

second resistor coupled in series with the second P-N junction device, third resistor coupled in parallel with the second resistor and the second P-N junction device;

operational amplifier operably coupled to control the first and second current sources based on voltages across the first and third resistors; and current mirror operably coupled to the first or second current source to provide a reference current.

11. The wireless communication device of claim 10, wherein resistance value of the second resistor is scaled with respect to resistance of the third resistor to adjust a slope of current through the second P-N junction device over temperature to be inversely proportional to a slope of current through the first P-N junction device over temperature.

12. The wireless communication device of claim 10, wherein the first and third resistors have substantially similar resistances.

13. The wireless communication device of claim 10, wherein the first and second P-N junction devices each comprise at least one of: a diode, a bipolar transistor, and a field effect transistor operable to emulate the bipolar transistor.

14. A wireless communication device comprises:

a receiver section that includes:

a low noise amplifier operably coupled to amplify an inbound radio frequency (RF) signal to produce an amplified RF signal;

receiver mixing module operably coupled to mix the amplified RF signal with a receiver local oscillation to produce an inbound low intermediate frequency (IF) signal;

receiver filter module operably coupled to filter the inbound low IF signal to produce a filtered inbound low IF signal; and an analog to digital converter operably coupled to convert the filtered inbound low IF signal to produce a digital inbound low IF signal;

a transmitter section that includes:

a digital to analog converter operably coupled to convert an outbound digital low IF signal into an outbound analog low IF signal;

transmitter mixing module operably coupled to mix the outbound analog low IF signal with a transmitter local oscillation to produce an up-converted signal;

transmitter filter module operably coupled to filter the up-converted signal to produce a filtered up-converted signal; and a power amplifier operably coupled to amplify the filtered up-converted signal to produce a outbound RF signal, wherein at least one of the low noise amplifier, the receiver mixer module, the receiver filter, the analog to digital converter, the digital to analog converter, the transmitter mixing module, the transmitter filter module, and the power amplifier includes a bandgap reference current source that includes:

first P-N junction device having a first temperature variant active voltage;

second P-N junction device having a second temperature variant active voltage, wherein the second P-N junction device is a larger device than the first P-N junction device;

first current source coupled to the first P-N junction device;

second current source coupled to the second P-N junction device, wherein the first and second current sources provide substantially similar currents;

temperature compensation circuit operably coupled to:

convert the first temperature variant active voltage into a first active current;

convert a difference between the first temperature variant active voltage and the second temperature variant active voltage into a second active current;

summing the first and second active currents to produce temperature invariant current; and control the currents produced by the first and second current sources based on the temperature invariant current; and current mirror operably coupled to the first or second current source to provide a reference current.

15. The wireless communication device of claim 14, wherein the first and second P-N junction devices each comprise at least one of a diode, a bipolar transistor, and a field effect transistor operable to emulate the bipolar transistor.

16. The wireless communication device of claim 14, wherein the first and second current sources each further comprises:

a P-channel field effect transistor.

17. The wireless communication device of claim 16, wherein the temperature compensation circuit further functions to control the currents produced by the first and second current sources further comprises:

generating a gate voltage for the P-channel field effect transistor of the first and second current sources based on the temperature invariant current.

18. The wireless communication device of claim 14, wherein the temperature compensation circuit further functions to convert the first temperature variant active voltage into a first active current to represent a slope of current through the first P-N junction device over temperature;

convert a difference between the first temperature variant active voltage and the second temperature variant active voltage into a second active current to represent a slope of current through the second P-N junction device over temperature, wherein the slope of the current through the first P-N junction device over temperature is inversely proportional to the slope of the current through the second P-N junction device.

* * * * *